Sept. 5, 1961  J. W. B. LADD  2,998,880
STERILE SURGICAL INSTRUMENT AND ASSEMBLY
Filed June 19, 1958
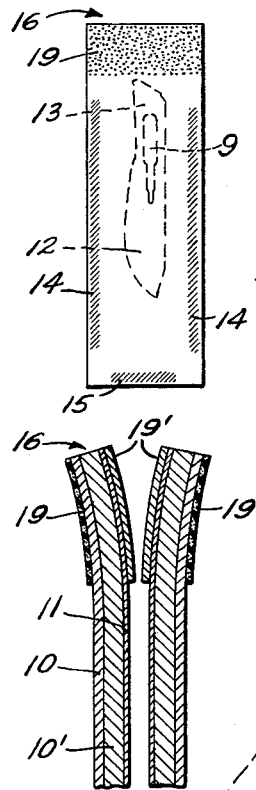
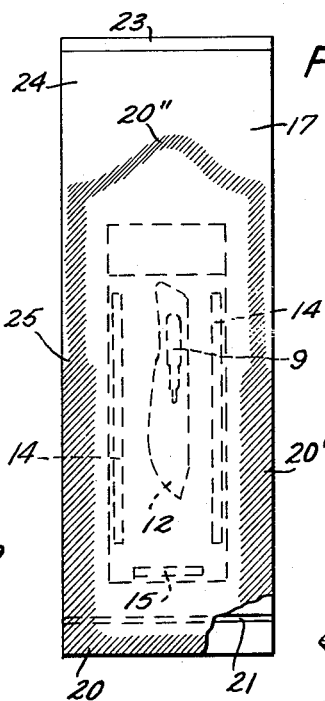
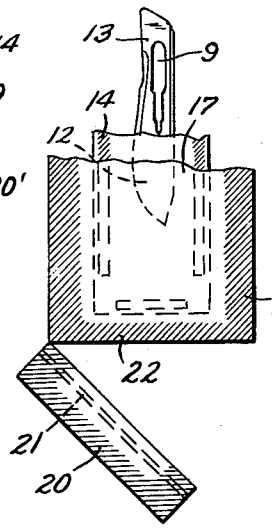
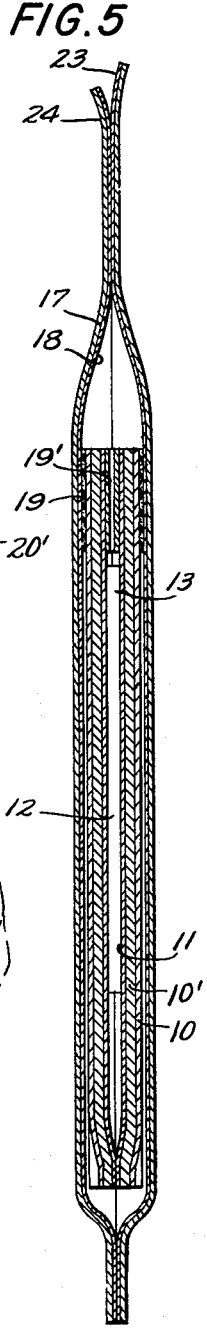
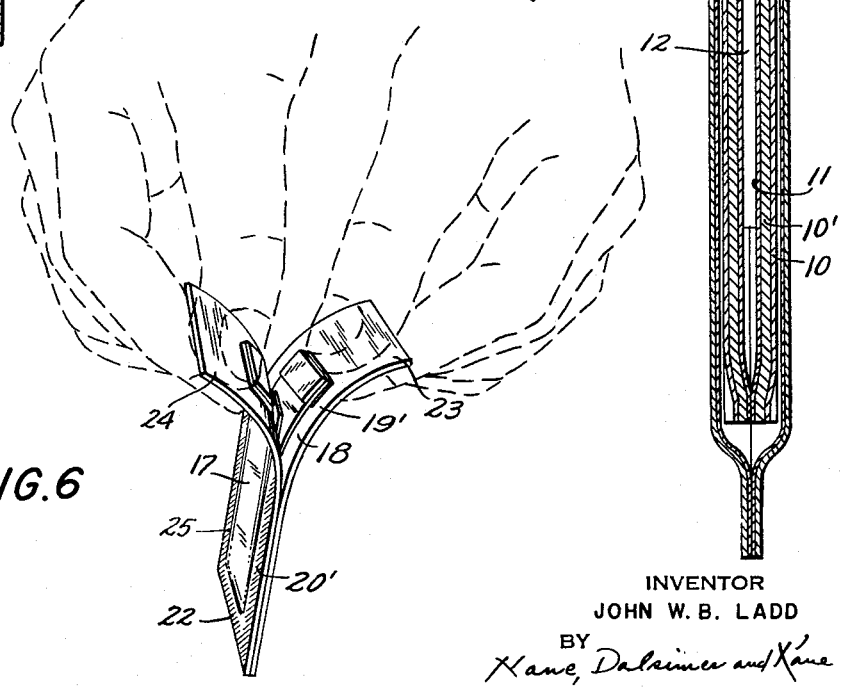
INVENTOR
JOHN W. B. LADD
BY
Kane, Dalsimer and Kane
ATTORNEYS

United States Patent Office 2,998,880
Patented Sept. 5, 1961

2,998,880
STERILE SURGICAL INSTRUMENT
AND ASSEMBLY
John W. B. Ladd, Ridgefield, Conn., assignor to Bard-Parker Company, Inc., Danbury, Conn., a corporation of New York
Filed June 19, 1958, Ser. No. 743,037
8 Claims. (Cl. 206—63.2)

This invention relates to a structurally and functionally improved sterile surgical instrument and assembly.

In their more specific aspects the present teachings are especially useful in providing a blade to be employed, for example, by a surgeon, which blade will be maintained in sterile condition by an improved assembly until the instant the blade is to be used.

A further object is that of designing an assembly which may be employed in the dispensing of a sterile blade in a manner such that the latter may readily be coupled to a blade-mounting handle.

Still another object resides in the production of a package embracing a surgical unit and in which the unit will be restrained from puncturing parts of the assembly enclosing the same. Moreover, that assembly will be subject to initial sterilization in which its interior surfaces and the contained surgical unit will become properly sterile; its exterior surfaces being also preferably sterilized by this operation, these exterior surfaces, upon subsequently becoming contaminated, being susceptible to repeated re-sterilizing operations without detrimentally affecting the assembly or its contained unit.

Among other objects are those of furnishing the components and the complete assembly at a nominal figure, which assembly will properly maintain a surgical unit; the assembly being capable of shipment, storage and handling under all reasonable conditions, while maintaining its interior sterility, and moreover, being capable of ready manipulation to render the surgical unit within the same accessible for use, for example, by a surgeon.

With these and other objects in mind, reference is had to the attached sheets of drawings illustrating practical embodiments of the invention and in which:

FIG. 1 is a plan view of one form of assembly element which may be included in the grouping of a sterile assembly as herein taught;

FIG. 2 is a fragmentary sectional view in enlarged scale of a portion of the element as shown in FIG. 1;

FIG. 3 is a plan view of a complete assembly;

FIG. 4 is a fragmentary view of the bottom portion of the assembly as shown in FIG. 3 and illustrating the same subsequent to the sterilizing action;

FIG. 5 is a sectional side view of the assembly with the thickness in separation of its components illustrated in a somewhat exaggerated manner; and FIG. 6 is a perspective view showing the manner in which the assembly is preferably opened for presentation of the blade to the user.

According to the preferred aspect of the present invention, the surgical instrument embodied in the assembly will be a blade of the scalpel type. This preferred concept has been illustrated throughout the drawings. Such a blade is usable when attached to a handle. The blade will include a body 12 having a cutting edge and presenting a tang end 13. Within the area of the latter an opening 9 is provided. When a part of the handle is introduced into the enlarged area of opening 9 and the blade body is slid toward the handle, then the edges of that opening will be received within suitable parts extending from the handle. Under continued relative movement of the blade and handle in the same direction the rear obliquely extending edge of the tang end 13 will abut against a complementary surface forming a part of the handle. Therefore, further movement of the blade in a rearward direction will be arrested, and with the parts in these positions, the blade will be retained against all probability of accidental separation from the handle. However, by flexing the blade and exerting a pull on the same in a direction away from the handle, a deliberate dismounting of the blade may be readily achieved.

The mounting of the blade upon the handle will preferably be effected by gripping the former while it is largely contained within an enveloping structure. Preferred forms of such a structure will be hereinafter described in detail. Suffice it to say that this structure embraces an envelope, areas of which will overlie the blade body 12, so that by exerting gripping pressure within the zone of these areas, the blade will be secured against movement with respect to the envelope. At the same time, however, its tang end may readily be presented for coupling with that handle, after which, by the release of the digital pressure, movement of the handle away from the package will withdraw the blade from within the latter.

While, as hereinafter described, various envelope structures may be provided, according to one preferred aspect, the present invention contemplates an assembly embracing an outer container within which an inner container or envelope is disposed. In turn, within that envelope a surgical instrument—such as a blade—is retained. As later explained, both the interior and exterior of the package may be sterilized. Simultaneously with the opening of the outer envelope, the inner container will be opened to expose the housed unit and present the same ready for use.

Such a package has been illustrated in FIGS. 1 to 6 inclusive. Referring primarily to FIGS. 1 and 2, the inner envelope has been shown. This includes layers 10 of suitable paper, which may be latex impregnated. Conveniently this paper will embody a tear-resistant structure as disclosed in the United States patent to Hermanson No. 2,541,763 of February 13, 1951, modified to eliminate or reduce the glycerine content. This substance is humectant, which causes the paper to absorb water vapor that under sterilizing temperatures of approximately 250° F. is given off and detrimentally combines with certain materials to cause the production of an unsatisfactory or faulty package. Therefore, where paper of this type is employed, the glycerine content should be either eliminated or drastically reduced.

Suitably secured to the inner faces of layers 10 are layers 10' formed of paper impregnated or coated with a suitable chemical capable of neutralizing the rusting properties of water vapor. Dicyclohexylammonium nitrite and sodium nitrite, urea (monoethanolamine benzoate) are examples of two such satisfactory chemicals. It is especially desirable to provide for this neutralizing action, in that it is preferred to use a carbon steel blade. Such a blade is capable of providing a surgically more desirable cutting edge. The blade being formed of carbon steel, it is especially susceptible to attack by moisture. If the paper be not impregnated with the chemical, then the latter may be applied in the form of a film 11.

Centrally of the areas of the superposed layers 10 a surgical unit, such as the blade of a scalpel, is disposed. This will include the body having a tang end. Preferably by heat sealing, layers 10 are combined to form an envelope. Such sealing, as especially shown in FIG. 1, embraces zones 14 adjacent the side edges of the layers and a zone 15 adjacent the lower edge of the envelope. It is to be observed that these zones are spaced from each other, so that a continuous line of sealing is not present. Adjacent the upper end of the envelope, sealing is eliminated.

Thus, is illustrated, the areas 14 of sealing preferably terminate short of what might be termed the upper end of the envelope, and flaps 16 are provided as part of the layers within that upper zone. By exerting outward pulls on these flaps 16, it is apparent that layers 10 may be separated from each other by rupturing the areas 14 of bonding or sealing. At this time it is to be understood that layers 10′ might conveniently be integrated in the assembly by laminating them to the bodies of sheets or layers 10.

The inner package or envelope thus provided is disposed within an outer package or envelope, as especially shown in FIG. 3. That package will embrace flexible layers or sheets 17 preferably of aluminum foil. The inner faces of these sheets will preferably be coated with a suitable heat-sealing material 18. Prior to inserting or disposing the inner envelope between the layers of the outer container, the exterior flap faces 16 of that envelope may be coated with a suitable adhesive, as indicated at 19 in FIG. 2. The need for incorporating this adhesive depends upon the particular chemical 11 used for coating or impregnating layers 10′. When an adhesive is found to be necessary, the use of an adhesive such as is used for laminating a vinyl film to aluminum is found to be satisfactory. This adhesive layer or zone should preferably be limited to the tab or flap zones 16 of the inner envelope. It may, of course, be extended at the election of the designer. Either the outer surfaces of the inner envelope or the inner faces of layers 17 might be coated, if necessary. To prevent the tabs from bonding together, strips 19′ of pressure-sensitive tape, or another suitable barrier, can be applied to their inner faces adjacent the upper edges thereof.

Returning to a consideration of FIG. 3, layers 17 are secured to each other preferably by heat sealing along a zone 20 extending across the bottom of the envelope, along the side edges of the same, as at 20′, and across the top of the envelope at a point short of its upper edge area, as at 20″. Interposed between the foil layers 17 at a position preferably short of the lower edge of the envelope is a thread 21 composed of a material through which gas may pass. The end edges of the thread terminate preferably in line with the side edges of the outer envelope. Therefore, in this assembly, gases may circulate through and escape from the interior of the package.

This flow will assure sterilization. The flow may be caused by the creation of gases within the interior of the assembly. This would occur incident to exposing such assembly to a proper temperature. However, it is preferred to create the gas flow as hereinafter recited. In any event, after such flow, the lower edge zone 20 of the envelope may be severed and discarded, as in FIG. 4. This will include removal of thread 21. Also as shown in this figure, a second zone of adhesion and sealing 22 is substantially simultaneously provided between the line of severance and the inner envelope. This zone is again preferably a heat seal, and with its establishment provides, in conjunction with zones or areas 20, 20′ and 20″, a seal completely framing the inner envelope or package within the outer envelope of the assembly.

The length of the two layers or sheets 17 providing the body of the outer package is preferably unequal. With the lower edge zones of those sheets in registry, it therefore follows that a top flap portion 23 forms a part of the longer layer adjacent the upper end of the package, and a flap portion 24 furnishes what might be termed a bottom flap, also adjacent that end of the envelope. Both these flaps or tabs are beyond the zone of upper sealing 20″. Therefore, they may readily be separated. While on the subject of sealing zones, it is to be noted that, as indicated at 25, the side zones 20′ may be relatively narrow at points above the middle portion of the package and relatively wide below those points. While a midway point is conveniently adhered to for this diminution of the sealing zones, it is apparent that its location might be varied. It is to be understood that the surfaces of tabs 23 and 24 are both preferably embossed, so that they may be readily gripped and retained within one's grasp. They may be folded upon the package to shorten the area of the latter.

In use, the blades are cleaned and disposed one within each inner envelope. Such envelope is in turn disposed within the outer envelope, as in FIG. 3, with a thread or equivalent unit, such as 21, in position, if—as is preferred—a sterilizing agent such as carboxide gas is employed under suitable pressure and temperature. The surfaces of the assembly are exposed to the action of this agent. The gas will enter through the passages existing as a consequence of the spaces or interstices of the thread body. With the zones of sealing 14 and 15 spaced from each other, the gas will be free to circulate through the inner envelope and past the surfaces of the blade or other element housed therein. Even if the spaces between zones 14 and 15 did not exist, effective sterilization would still occur by having the material of the inner envelope permeable to gas. However, by providing these gaps, the interval required for sterilization is reduced.

With sterilization completed, the lower end zone of the outer package is removed, as in FIG. 3, and with the immediate establishment of the subsequent zone 22 of sealing, a complete sealing line or frame is provided around the inner envelope. The specific sterilization technique may involve placing a number of packages within a suitable container, the interior of which is subjected to a vacuum of approximately 25″. Thereupon, a mixture of approximately 20% carboxide gas to 80% air is introduced into the container under a pressure of approximately 25 pounds to the square inch and at a temperature of 120° F. This gas may have a moisture content of not less than 25%. The pressure and temperature are maintained from four to sixteen hours. Thereafter, the packages are subjected within the container to a vacuum of around 25″ for thirty minutes, while the temperature is maintained at 120° F. Then filtered, dry air is introduced into the container at atmospheric pressure. If under suitable testing it appears that they are biologically safe and in proper sterile condition, then the lower end sections of the outer envelopes, including the threads, are removed, and the final seal 22 is provided.

Of course, if the material of the inner envelope or the inner face of the outer envelope include substances which under the action of heat will give off gases resulting in sterilization of the blade and the interior of the envelope, then the assembly need not be placed in an atmosphere of gas under pressure for this purpose. Also, under these conditions, thread 21 and the severable section with which it is associated need not be employed. Under certain conditions, satisfactory sterilization of the surgical unit and the interior of the assembly containing the same may be achieved by resorting to various well-known techniques involving exposure to rays or other procedures. It is found, however, that quite satisfactory sterilization does occur where the material of the envelope assembly contains a suitable substance which, on exposure to a degree of heat not detrimentally affecting the assembly, releases a proper sterilizing gas or atmosphere.

The packages with the contained units will in any event now remain in proper sterile condition for indefinite periods of time. It is apparent that by applying suitable indicia upon the outer face of the exterior envelope, a casual observer will be able immediately to determine the precise type and shape of the blade or other article contained within the package. Also, the exact date when sterilization of the package occurred may be determined. When it appears that a scalpel will be required in the near future in the operating room, a desired number of these units of the requisite type may be placed in an autoclave for a suitable period of time. This will assure sterility of the exterior surfaces of these packages. Accordingly, an operating room nurse may simply grip flaps or tabs 23 and 24 and pull them apart to initiate the opening of the package.

That initiation will involve the destruction of the upper zone 20" of sealing and continue along the side edge zones 20' of the outer envelope. Due to the fact that the adhesive 19 provides for a firmer bond between layers 10 of the inner envelope and layers 17 of the outer envelope than is provided by zone 20", the tabs 16 of the inner envelope will separate. This separation will continue through the upper areas of the sealing zones 14. Such action will expose the tang end of blade 12, as shown in FIG. 6. Too great a separation of the layers will not occur, because when layers 17 have been pulled apart up to point 25, the increased width or area of the seal zones 20' will resist further separation. Therefore, complete opening of the package, with danger of the enclosed article falling free of the same, is avoided. Rather, and as illustrated in FIG. 6, the tang end may be exposed toward the person holding the operating handle.

For sterilizing the exterior surfaces of the package, it will also be understood that radiation, heat and chemical techniques may be used wherever applicable. With the package constructed in accordance with the foregoing description, it has been found that no detrimental effects occur incident to initial or subsequent autoclaving actions on the outside surfaces of the package. Tests have shown that the package will in no wise be adversely affected when exposed to 20 pounds pressure for suitable periods of time at approximately 265°.

As will be understood, by employing an inner envelope in addition to the outer layer, any danger of the blade accidentally puncturing the package is greatly reduced, if not entirely eliminated. The sharpened blade will first be packaged in a protective envelope in such a manner that the cutting edge will not be damaged. This envelope containing the blade will then be packaged in another sealed package by automatic machinery. This procedure protects the delicate cutting edge from the damage which might occur through handling in the usual packaging machinery.

A very satisfactory form of support is provided to the person gripping the surfaces of the package. So gripped, the tang end of the blade aways extends in the direction of the outer end of the package. Proper opening of the package will be assured by the provision of the barrier established by the masking tape strips 19'. Accordingly, the tang end of the blade is maintained in the same position with reference to a given point, such as the end of the blade holder gripped by the hand of the surgeon or nurse. The areas of sealing 14 and 15 need not be spaced, because the kraft paper as well as the tear-resistant paper are both permeable to gases. The location of the sealing area 15 will vary, depending upon the length of the packaged blade. It should be fairly close to the end of the latter.

While it is preferred in many respects that the package assembly embrace outer and inner envelopes or containers, as heretofore described, by employing suitable materials a single container only may be utilized. That container would involve walls preferably of metallic foil, to the inner faces of which a polyester film woud be applied. That film would occupy the same position as the layer 18 previously described. Where the inner envelope is dispensed with, the areas of sealing between the layers of the package or container would follow substantially the configuration as shown in FIGS. 2, 3 and 4. In other words, they would involve areas such as 20', 20", 22 and 25. These areas would be shifted inwardly to lie substantially adjacent the edges of the blade 12—13. So arranged, they would assure that in the handling of the package there would be minimum danger of the blade perforating the outer walls. Also, they would maintain that blade against undue shifting with respect to the package during the handling of the latter, and especially as it was being opened.

During and after opening, the polyester film (or its functional equivalent) would assure the establishment of gripping zones. Accordingly, a nurse or other user could grasp the assembly between thumb and forefinger while separating the tabs or outer end portions of the envelope to expose the blade. Thereupon, while still gripping the assembly, the blade would be presented for coupling with the handle. These operations could both be achieved without fear that the nurse, or other user, would be injured incident to the blade penetrating the reinforcing film and flexible envelope to cut the gripping fingers. Accordingly, a puncture-resistant dispensing assembly is in all instances provided. After initial heat sterilization (at temperatures as low as 257°)—although higher temperatures and other procedures may be employed—the interior of the assembly will remain in proper condition. The exterior of the envelope may be repeatedly sterilized without detriment to the appearance of the blade or the package.

From the foregoing, it will be understood that among others, the several objects of the invention as specifically aforenoted are achieved. Obviously, numerous changes in construction and rearrangements of the parts may be resorted to, and the steps of the method may be varied, without departing from the scope of the invention as defined by the claims.

I claim:

1. In a substantially punctureproof, air-sealed package for a surgeon's blade having a cutting portion and a tang portion: an inner blade-receiving envelope comprised of two elongated superposed layers of tear-resistant material extending at least adjacent the cutting portion of said blade, said layers being bonded together adjacent their edges along said blade and across the ends adjacent the cutting portion of said blade, their opposite end zones extending across the blade tang portion; and an outer air-sealed envelope comprised of two elongated superposed layers of foil material strongly bonded together along a relatively narrow airtight line of sealing about a central area defining a compartment enclosing said inner envelope, the layers of tear-resistant material forming said inner envelope adjacent their end edges across the tang portion of said blade being bonded to the inner surfaces of the layers of said outer envelope whereby separation of the layers of both envelopes in the direction of the length of the blade may be effected by separation of the layers of said outer envelope.

2. In a package as defined in claim 1, the layers of the outer envelope being longer than those of the inner envelope and projecting beyond the edges of the latter, including those edges adjacent the blade tang portion, and said projecting layer parts furnishing extensions providing flaps to enable a user to initiate separation of said layers of the outer envelope and a subsequent opening of the inner envelope.

3. A substantially punctureproof sealed package comprising, in combination, a blade having a cutting and a tang end, an inner envelope of superposed layers of tear-resistant material enclosing said blade, an outer envelope of superposed layers of air-impervious material, the layers providing the outer envelope having greater width and length than the layers of the inner envelope, extending beyond the edges of the latter and being bonded together within those extended zones to sealingly enclose said inner envelope, the layers of the inner envelope adjacent the tang end of the blade being secured to the proximal zones of the outer envelope layers whereby—as the latter are separated—the inner envelope will be progressively opened to expose an increasing length of the tang blade end.

4. In a package as defined in claim 3, the layers of the outer envelope adjacent the tang end of the blade extending beyond the area of bonding and flap portions forming parts of the extended zones of the layers of the outer envelope to facilitate disruption of the adjacent bonded area and separation of the layers as well as exposure of the tang end of the blade.

5. In a package as defined in claim 4, a strip of barrier material interposed between said flap portions and said strip preventing adhesion of said portions to each other.

6. In a package as defined in claim 3, the layers of the inner envelope being also bonded together; such bonding extending throughout major length zones and the width zone adjacent the cutting end of the blade.

7. In a package as defined in claim 5, the bonding of the layers of the inner envelope being interrupted throughout the width zone thereof adjacent the tang end of the blade.

8. In a package as defined in claim 3, means intermediate the length of the layers providing the outer envelope and included in the bonding of such layers to offer increasing resistance to their separation, and such means being to one side of the area within which said inner envelope is disposed.

References Cited in the file of this patent

UNITED STATES PATENTS

| | | |
|---|---|---|
| 1,639,996 | Groff | Aug. 23, 1927 |
| 1,800,143 | Hughes | Apr. 7, 1931 |
| 2,262,111 | Moore | Nov. 11, 1941 |
| 2,281,473 | Brewer | Apr. 28, 1942 |
| 2,297,375 | Vogt | Sept. 29, 1942 |
| 2,633,284 | Moffett et al. | Mar. 31, 1953 |
| 2,676,702 | Whitefoot | Apr. 27, 1954 |
| 2,751,074 | Ringlen et al. | June 19, 1956 |
| 2,836,942 | Miskel | June 3, 1958 |
| 2,866,542 | Svirchev | Dec. 30, 1958 |

FOREIGN PATENTS

| | | |
|---|---|---|
| 478,680 | Canada | Nov. 20, 1951 |